United States Patent
Zhai et al.

(10) Patent No.: US 10,108,314 B2
(45) Date of Patent: Oct. 23, 2018

(54) METHOD AND SYSTEM FOR DISPLAYING AND PROCESSING HIGH DYNAMIC RANGE VIDEO AND IMAGES

(75) Inventors: Jiefu Zhai, Cupertino, CA (US); Joan Llach, Cesson Sevigne (FR); Zhe Wang, Plainsboro, NJ (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 13/805,185

(22) PCT Filed: Jun. 23, 2011

(86) PCT No.: PCT/US2011/041564
§ 371 (c)(1),
(2), (4) Date: Dec. 18, 2012

(87) PCT Pub. No.: WO2011/163438
PCT Pub. Date: Dec. 29, 2011

(65) Prior Publication Data
US 2013/0091430 A1 Apr. 11, 2013

Related U.S. Application Data

(60) Provisional application No. 61/358,605, filed on Jun. 25, 2010.

(51) Int. Cl.
*G06F 3/048* (2013.01)
*G06F 3/00* (2006.01)
(Continued)

(52) U.S. Cl.
CPC ............ *G06F 3/0484* (2013.01); *G06T 5/007* (2013.01); *G06T 5/40* (2013.01); *G06T 2200/24* (2013.01);
(Continued)

(58) Field of Classification Search
CPC ............ G11B 27/326; H04N 21/4318; H04N 21/440272; H04N 21/440245;
(Continued)

(56) References Cited

U.S. PATENT DOCUMENTS 5,682,326 A * 10/1997 Klingler ............ G06F 17/30017
348/E5.051
6,744,968 B1 6/2004 Imai et al.
(Continued)

FOREIGN PATENT DOCUMENTS

JP 11313244 11/1999
KR 20060012278 2/2006
(Continued)

OTHER PUBLICATIONS

Long, Ben., "Take a First Look at Adobe's Lightroom," Jan. 11, 2006, retrieved from http://www.creativepro.com/article/take-a-first-look-at-adobe-s-lightroom, p. 4.*
(Continued)

*Primary Examiner* — Hugo Molina
(74) *Attorney, Agent, or Firm* — Lily Neff

(57) ABSTRACT

A tone mapping graphical user interface (GUI) is provided that allows a video engineer to process a video using a set of tools for changing high dynamic range data into lower dynamic range data. The tone mapping GUI includes a video player region that includes the current video output section for a region-based method of performing HDR conversion, and a current video output section for a reference method that performs HDR conversion using, for example, a global process.

12 Claims, 8 Drawing Sheets

(51) Int. Cl.
  *G06K 9/00* (2006.01)
  *G06F 3/0484* (2013.01)
  *G06T 5/00* (2006.01)
  *G06T 5/40* (2006.01)

(52) U.S. Cl.
  CPC .............. *G06T 2207/10016* (2013.01); *G06T 2207/20092* (2013.01); *G06T 2207/20208* (2013.01)

(58) Field of Classification Search
  CPC . G06T 2207/10144; G06T 2207/10152; G06T 2207/20208; G06T 2207/20172; G06T 2207/20182; G06T 2207/20201; G06T 5/007; G06T 5/00; G06T 22/00; G06F 3/048; G06F 3/00; G06K 9/00
  USPC .................................................. 715/726, 725
  See application file for complete search history.

(56) References Cited

U.S. PATENT DOCUMENTS

| | | | |
|---|---|---|---|
| 6,888,552 B2* | 5/2005 | Debevec ............... | G06T 11/001 345/589 |
| 6,968,337 B2 | 11/2005 | Wold | |
| 7,382,931 B2 | 6/2008 | Kang et al. | |
| 7,551,776 B2 | 6/2009 | Jeffrey et al. | |
| 7,643,035 B2* | 1/2010 | Toyama et al. ............... | 345/589 |
| 7,660,464 B1* | 2/2010 | Peterson .................. | G06T 5/50 382/181 |
| 7,786,999 B1* | 8/2010 | Reid ........................... | 345/581 |
| 7,805,678 B1* | 9/2010 | Niles et al. .................. | 715/716 |
| 8,213,711 B2* | 7/2012 | Tam ...................... | G06T 7/0051 382/162 |
| 8,237,730 B1* | 8/2012 | Anderson et al. ............ | 345/589 |
| 2002/0198789 A1 | 12/2002 | Waldman | |
| 2003/0161549 A1* | 8/2003 | Lei .......................... | G06T 5/009 382/274 |
| 2004/0001079 A1 | 1/2004 | Zhao et al. | |
| 2004/0017594 A1* | 1/2004 | Suekane .............. | H04N 1/6027 358/516 |
| 2005/0243176 A1 | 11/2005 | Wu et al. | |
| 2005/0243177 A1 | 11/2005 | Kang et al. | |
| 2006/0018538 A1 | 1/2006 | Jeffrey et al. | |
| 2006/0153445 A1* | 7/2006 | Lin ......................... | G06T 5/009 382/169 |
| 2006/0158462 A1* | 7/2006 | Toyama .................. | G06T 5/007 345/629 |
| 2006/0240862 A1 | 10/2006 | Neven et al. | |
| 2007/0195347 A1* | 8/2007 | Momose ................... | H04N 1/62 358/1.9 |
| 2008/0025633 A1 | 1/2008 | Szeliski | |
| 2008/0064349 A1 | 3/2008 | Flask et al. | |
| 2008/0130994 A1* | 6/2008 | Lin ........................ | G06T 5/009 382/169 |
| 2008/0131016 A1* | 6/2008 | Kokemohr .............. | G06T 5/009 382/254 |
| 2008/0263450 A1* | 10/2008 | Hodges et al. ............... | 715/723 |
| 2010/0080448 A1* | 4/2010 | Tam et al. ..................... | 382/154 |
| 2010/0153520 A1* | 6/2010 | Daun et al. .................... | 709/218 |
| 2010/0157078 A1* | 6/2010 | Atanassov et al. ........ | 348/222.1 |
| 2010/0210358 A1* | 8/2010 | Csurka .................... | A63F 13/10 463/31 |
| 2010/0246953 A1* | 9/2010 | Guermoud ........... | H04N 7/0115 382/168 |
| 2010/0260426 A1 | 10/2010 | Huang et al. | |
| 2010/0260468 A1* | 10/2010 | Khatib ................ | G06F 11/0757 386/278 |
| 2010/0281371 A1* | 11/2010 | Warner et al. ................ | 715/720 |
| 2010/0281382 A1* | 11/2010 | Meaney et al. ............... | 715/723 |
| 2010/0281384 A1* | 11/2010 | Lyons et al. .................. | 715/723 |
| 2010/0309973 A1* | 12/2010 | Chien .............. | H04N 21/23439 375/240.02 |
| 2011/0075944 A1* | 3/2011 | Yuan ...................... | G06T 5/007 382/274 |
| 2011/0090959 A1* | 4/2011 | Wiegand et al. ........ | 375/240.12 |
| 2011/0292237 A1* | 12/2011 | Imai ....................... | H04N 9/735 348/223.1 |
| 2012/0017152 A1* | 1/2012 | Matsuda et al. .............. | 715/723 |
| 2013/0121572 A1* | 5/2013 | Paris ...................... | H04N 19/30 382/166 |
| 2013/0253846 A1* | 9/2013 | Hayter ............... | A61B 5/14532 702/19 |

FOREIGN PATENT DOCUMENTS

| | | |
|---|---|---|
| WO | 2008/064349 A1 | 5/2008 |
| WO | 2009/078862 A1 | 6/2009 |
| WO | 2010/071839 A1 | 6/2010 |

OTHER PUBLICATIONS

UFRAW, UF RAW User Guide, 2009, pp. 1-9.*
Canon, "Technical Report: Software for High-Speed Raw Image Processing and Real-Time Editing," Jul. 2004, Retrieved from Internet Jul. 27, 2005, pp. 1-5.
Adobe Systems Inc., "Using Adobe Photoshop Lightroom 2, Chapter 8: Developing photos," Sep. 3, 2009, pp. I-V, 98-123, Retrieved from Internet Sep. 7, 2011.
Lischinski et al., "Interactive Local Adjustment of Tonal Values," vol. 25 Issue 3, Jul. 2006 pp. 646-653.
Wang et al., "Interactive Tone Mapping for High Dynamic Range Video," ICASSP 2010, pp. 1014-1017.
Search Report dated Sep. 7, 2011.
Chen et al., "A Multicurve Tone Mapping Operator for the Display of High Dynamic Range Image and Video" IEEE Conference, London, GB, Nov. 27, 2007, pp. 1-7.
Chen et al., "Real-Time Edge-Aware Image Processing with the Bilateral Grid", ACM, New York, Jul. 2007.
Han et al., "Automatic Illumination and Color Compensation using Mean Shift and Sigma Filter", IEEE Transactions on Consumer Electronics, vol. 55, No. 3, Aug. 2009, pp. 978-986.
Lee et al., "Gradient Domain Tone Mapping of High Dynamic Range Videos", Image Proessing, 2007 ICIP 2007, Sep. 1, 2007, pp. III-461.
Lischinski et al., "Interactive Local Adjustment of Tonal Values", ACM, New York, 2006.
Adobe Systems Inc., Using Adobe Photoshop Lightroom 2, Sep. 3, 2009, pp. I-V, 98-123, Retrieved from Internet Sep. 7, 2011.
Long: "Take a First Look at Adobe's Lightroom", Jan. 11, 2006, retrieved from http:www.creativepro.com/article/take-a-first-look-at-adobe-s-lightroom, p. 4.
www.luxrender.net/wiki/index.php?title=LuxRender_Tone_mapping retrieved Dec. 8, 2010.

* cited by examiner

METHOD AND SYSTEM FOR DISPLAYING AND PROCESSING HIGH DYNAMIC RANGE VIDEO AND IMAGES

CROSS-REFERENCE TO RELATED APPLICATION

This application claims the benefit, under 35 U.S.C. § 365 of International Application PCT/US2011/041564, filed Jun. 23, 2011, which was published in accordance with PCT Article 21(2) on Dec. 29, 2011 in English and which claims the benefit of U.S. provisional patent application No. 61/358,605, filed Jun. 25, 2010.

FIELD OF THE INVENTION

The invention is related to a graphical user interface for tone mapping high dynamic range video.

BACKGROUND OF THE INVENTION

Video engineers often need to process video using a set of tools for changing high dynamic range data into lower dynamic range data. The changes may be used, for example, to accommodate different display devices that only have lower dynamic range capability. Different low dynamic range devices may also have different ranges. Additionally, it is not always straightforward to determine the best way to map high dynamic range values into lower dynamic range values so as to produce the best user experience. Thus, it is useful to have a graphical user interface that enables processing high dynamic range data in different manners to produce a final output.

SUMMARY OF THE INVENTION

A tone mapping user interface is provided that allows one, typically a video engineer, but not necessarily in a professional context, to process a video using a set of tools for changing high dynamic range (HDR) data into lower dynamic range data. The interface includes a video player region that includes the current video output section for a region-based method of performing HDR conversion, and a current video output section for a reference method that performs HDR conversion using, for example, a global process. Each section has an associated video section and histogram region. The histogram in the histogram region shows a histogram for the current frame being displayed in video section. The interface includes various operators and filters that a user, for example a video engineer, can select and apply to the video segment. Fine tuning options are provided which can include tone mapping operators, light adaptation operators, and post-processing filters. The interface displays anchor points for segmenting one or more images and includes the feature of the user moving the anchor points to cause new segmentation, whereby the user interface display shows information indicating the new segmentation (e.g. masks) as well as new tone mapped output based on the new segmentation.

A method of processing video data using a graphical user interface is provided that involves displaying a frame of the video data in a video player region of the graphical user interface, wherein the frame is displayed in a regional current video output section for a region-based tone mapping and in a global current video output section for a global-based tone mapping in which the regional current video output section and the global current video output section are arranged side by side; displaying a regional control section adjacent to the video player region, the regional control section having a regional changeable exposure control means and a regional changeable contrast control means for multiple regions; and displaying a global control section adjacent to the regional control section, the global control section having a global changeable exposure control means and a global changeable contrast control mean; wherein the regional current video output section and the global current video output section are displayed simultaneously on one screen. The method can further comprise displaying a regional video section and a regional histogram region in the regional current video output section, wherein anchor points are displayed in the global histogram region; and displaying a global video section and a global histogram region in the global current video output section. Additional steps can include displaying an operator section and a time line that are adjacent to one another and below the video player region, wherein the time line shows the time of the frame of video that is being processed and wherein the time line and the operator section are displayed simultaneously on the screen. Other steps can include displaying a color histogram region that simultaneously shows individual color histograms on the screen for the frame of video that is being processed, wherein the color histogram region is adjacent to the video player region; applying changes to the video through the graphical user interface by adjusting at least the regional changeable exposure control means or the regional changeable contrast control means for multiple regions, wherein a visual result of the changes to the video are displayed in video player region; or applying changes to the video through the graphical user interface by adding at least one operator to the operator section, wherein a visual result of the changes to the video are displayed in video player region.

BRIEF DESCRIPTION OF THE DRAWINGS

The invention will now be described by way of example with reference to the accompanying figures which are as follows.

DETAILED DESCRIPTION OF THE EMBODIMENTS

Figure 1:
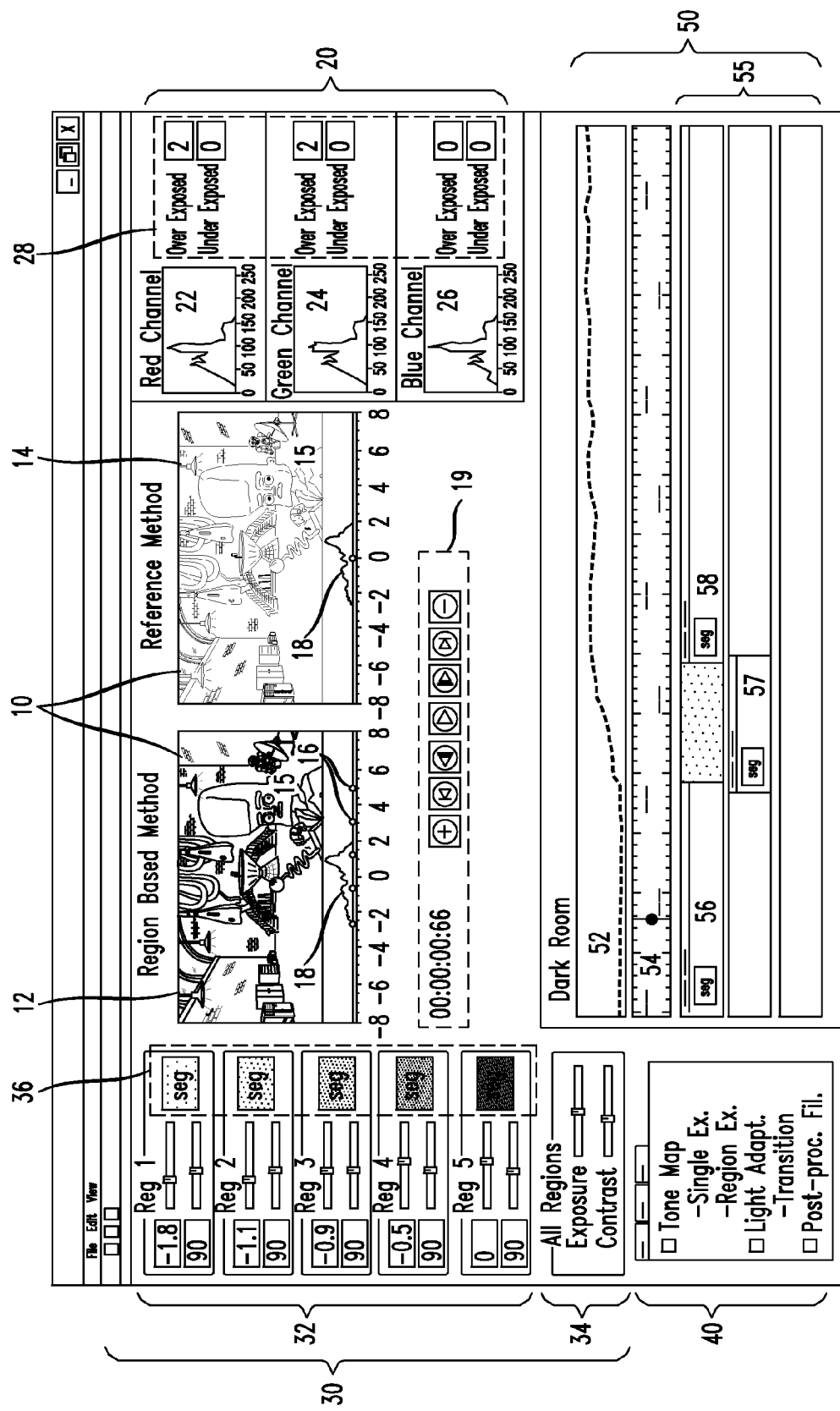
FIG. 1 shows a first view of the user interface at a first point in time.

FIG. 1 shows a user interface screen shot according to one implementation of the invention. The invention includes an algorithm adapted to produce the screen shown when the tone mapping project is first initiated for a particular video segment. Here, a particular video segment can be a single frame, a single sequence, or an entire movie.

FIG. 1 includes a video player region 10 that includes the current video output section 12 for a region-based method of performing HDR conversion, and a current video output section 14 for a reference method that performs HDR conversion using, for example, a global process. Each section 12, 14 has an associated video section 15 and histogram region 18. The histogram region 18 shows a histogram for the current frame being displayed in video section 15. In the implementation of FIG. 1, the total histogram region 18 shows the histogram of the original HDR image in log 2 scale. The histograms are population data as a function of intensity.

Each histogram region also includes one or more anchor points 16 showing how the histogram was divided into regions for the region-based processing. Note that because the reference method of section 14 is presumed to be a global method of processing HDR content, there is only one region and only one anchor point. The region-based method operates on the histogram values associated with the corresponding anchor point. The histogram values associated with an anchor point (such as, for example, the third anchor point from the left) may be defined, for example, as the values extending from the mid-point between the second and third anchor points to the mid-point between the third and fourth anchor points. The presentation of the current video frame for the region-based method and the reference method allows, for example, a video engineer to see in real-time the difference in output between the two processing methods. The section or video player region 10 also includes a timer section 19 that provides a running timer indicating the current location in the video segment, and a series of control buttons for controlling playback of the video segment.

Note that the anchor points are calculated on a set of frames corresponding to a given operator. This is explained further below in the discussion of the parameter settings region and the dark room.

FIG. 1 includes a histogram region 20 that includes a red histogram 22, a green histogram 24, and a blue histogram 26 for the current frame. Each color histogram 22, 24, 26 also has an associated readout 28 that indicates a level for each of "overexposed" and "underexposed" pixels. Readouts 28 indicate the number of pixels that are at the maximum value (for an 8-bit field, the maximum is typically 255) by the "overexposed" readout. Readouts 28 also indicate the number of pixels that can be at the minimum value for an 8-bit field by the "underexposed" readout, wherein the minimum is typically 0. Other implementations of the readouts 28 can use, for example, indicators of the percentage of pixels that are overexposed or underexposed, rather than the actual number of pixels. The color histograms 22, 24, 26 can be useful, for example, by indicating whether the current region-based settings are producing saturation in one or more of the colors.

FIG. 1 includes a parameter settings region 30 for controlling, for example, exposure and contrast. Exposure and contrast have been included because these are typically considered to be high-level parameters that most viewers and/or video engineers understand. Region 30 includes a region-based control section 32 and an all-regions control section 34. The region-based control section 32 includes separate controls for exposure and contrast for each of the regions. FIG. 1 shows five regions in section 32, which correspond to the five anchor points 16. The exposure and/or contrast for each region can be separately changes or the exposure and/or contrast can be changed using the all-regions (global) control section 34. The algorithm is adapted such that by moving the controls for the all-regions control section 34, all of the regions are changed at the same time. The controls can be depicted as slider bars that can be moved, for example, my using a mouse or other pointing device.

Region-based control section 32 also includes, for each region, a mask, a weight image, or grey-scale image 36, wherein the images of the different regions of the frame are shown within the dotted line of 36 in the figures and are represented by the expression "seg" for ease of presentation in which these images are scaled versions of the images in the video player region 10. The mask gives an indication of which portions of the current frame are in that region. The mask provides this information by using higher luminance or brighter values for those locations that have a higher probability or weight of being in that region. As a video segment is played, a user can see the weight images change for every frame, and can thereby see a visual indication of how many of the frames use or populate the different regions.

The control sections 32, 34 apply to the entire set of frames that are being operated on by the current operator. This is further explained in the section on the dark room.

FIG. 1 includes a workflow region 40 allowing a user to view information about various pieces of information such as job setup, tone mapping, and fine tuning. The options for fine tuning are displayed in FIG. 1 and include various operators and filters that a video engineer can select and apply to the video segment, as will be explained in the discussion of the dark room. The fine tuning options shown in FIG. 1 include tone mapping operators, light adaptation operators, and post-processing filters.

Tone mapping operators may include, for example, a single exposure operator which refers to a known tone mapping technique that applies a global algorithm, and a region-based operator. The region-based operator refers to a proprietary tone mapping algorithm. Other tone mapping operators may also be included in the selection and used in processing a video segment.

Light adaptation operators include, for example, a transition processor. In portions of a video segment in which the light is dynamically changing, it may be preferable to use a transition processor rather than to use a single operator. The transition processor of this implementation interpolates between the operators on either side of it as will be described in the discussion below of the dark room to automatically select exposure and contrast settings. Further, the selected exposure and contrast settings may change for every frame, which may be important if the lighting is changing in every frame. Additionally, in the transition processor, the anchor points and the associated segmentation are potentially changed in every frame also, rather than remaining constant throughout a scene.

Post-processing filters include, for example, a blur filter and a sharpening filter. Other filters, as is well known, may also be included and used in processing the video segment. The filters are applied to the tone mapped output, but filters can also be applied prior to the tone mapping.

The workflow region 40 also allows a user to control information about the job setup such as, for example, where the HDR files are to opened from, or where the tone mapped output is to be stored. The workflow region 40 also allows a user to select automatic tone mapping or interactive region-based tone mapping.

FIG. 1 includes a dark room region 50. Dark room region 50 includes an average luminance curve 52 that shows the average luminance of each frame in the video segment, a time chart 54 that also indicates the time of the frame that is currently being viewed in sections 12 and 14 in which the current time is shown by a dot at location 66 seconds in FIG. 1, an operator section 55 that shows the various filters being applied to the video segment and the particular time spans for which the operators are being applied. Section 55 by way of example includes, in FIG. 1, a region-based operator 56, followed by a transition processor 57, followed by another region-based operator 58. The operator sections 55 in all of the figures shows small images of a frame within the particular operator section, wherein the images are designated as "seg" for ease of presentation.

A video engineer or other user can, for example, drag a region-based operator from the fine tuning section of the workflow region 40 and drop it in the operator section 55. The video engineer can then adjust the ends of the inserted operator so that the operator is applied to the desired time span. A video engineer can typically apply separate region-based operators to different sequences, and then apply a transition operator 57 to the transition period between the two sequences. The transition operator 57 can be designed, for example, to interpolate between the two region-based operators. In one implementation, the transition processor performs interpolation for the entire span of time that the transition processor is defined. Thus, for example, in FIG. 1 the transition processor 57 actually starts before the end time of the region-based operator 56, and the transition processor 57 actually ends after the start time of the region-based operator 58. However, the region-based operator effectively stops when the transition processor 57 starts, and the region-based operator 58 does not begin until the transition processor 57 ends.

All operators are created automatically in this implementation, although operators may be added and adjusted manually. Each operator works on a certain range of frames, as shown by the locations on the time chart 54 that coincide with an operator's boundaries. The parameters for each operator are estimated and shown in the parameter settings region 30 as the contrast and exposure parameters.

Additionally, as indicated earlier, the anchor points are determined for each operator, and the exposure and contrast controls are applied separately to each operator. This can be useful for typical applications in which operators are adjusted in time so that a given operator only applies to a particular video sequence. In that way, each particular video sequence can have a constant exposure setting, a constant contrast setting, and region boundaries can remain relatively constant throughout the scene because the anchor points will not change.

Figure 2:
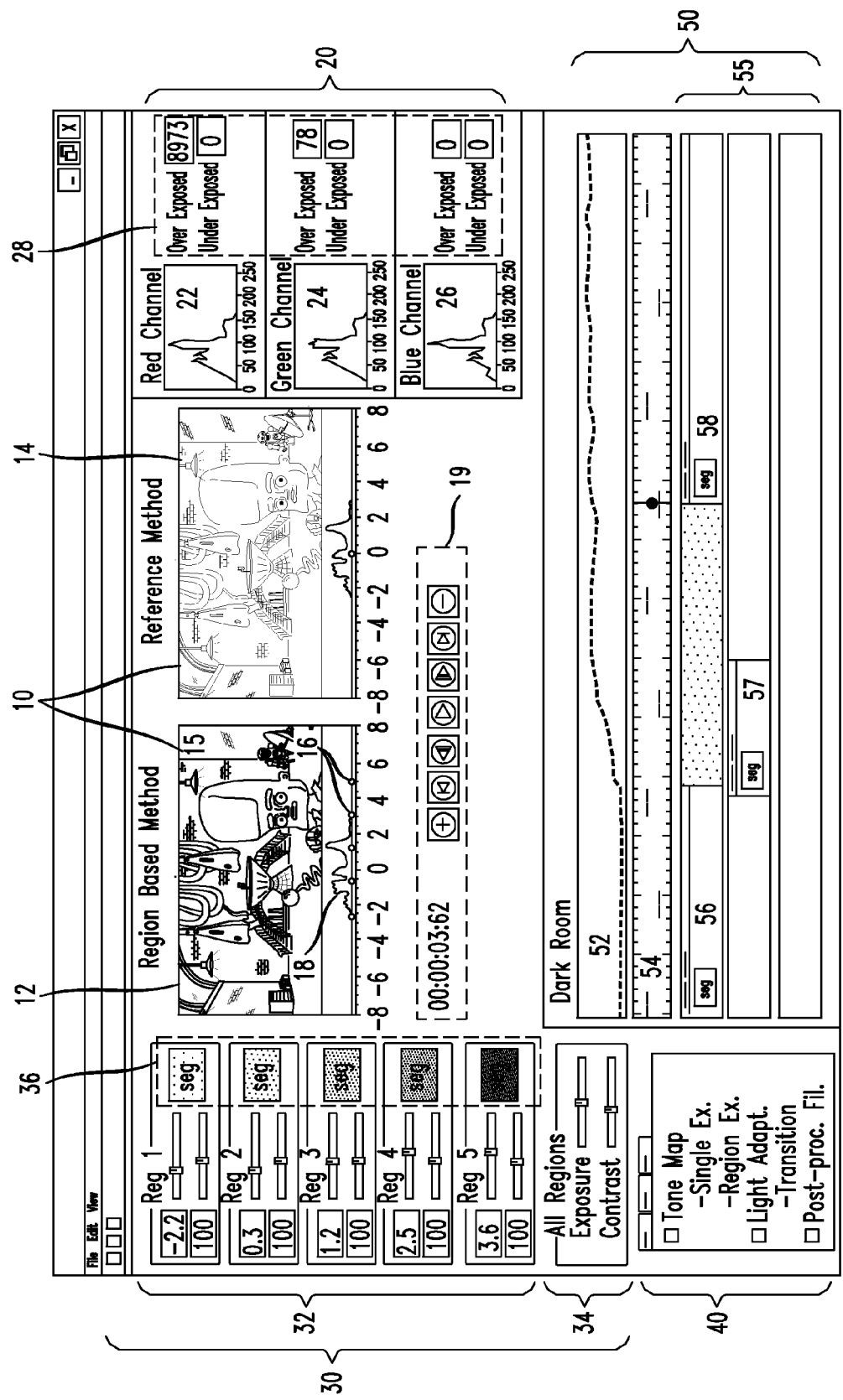
FIG. 2 shows a second view of the user interface at a second point in time which highlights the introduction of numerous overexposed pixels.

FIG. 2 shows the result of the user changing the working range of operator 58. The user has dragged the start time for the operator 58 toward the right to a later start time on the time chart 54, which is shown to be approximately 3:62. More generally, the user can change the working range of any operator. The current frame is noted at 3:62 and shows saturation on the red histogram in section 22.

Figure 3:
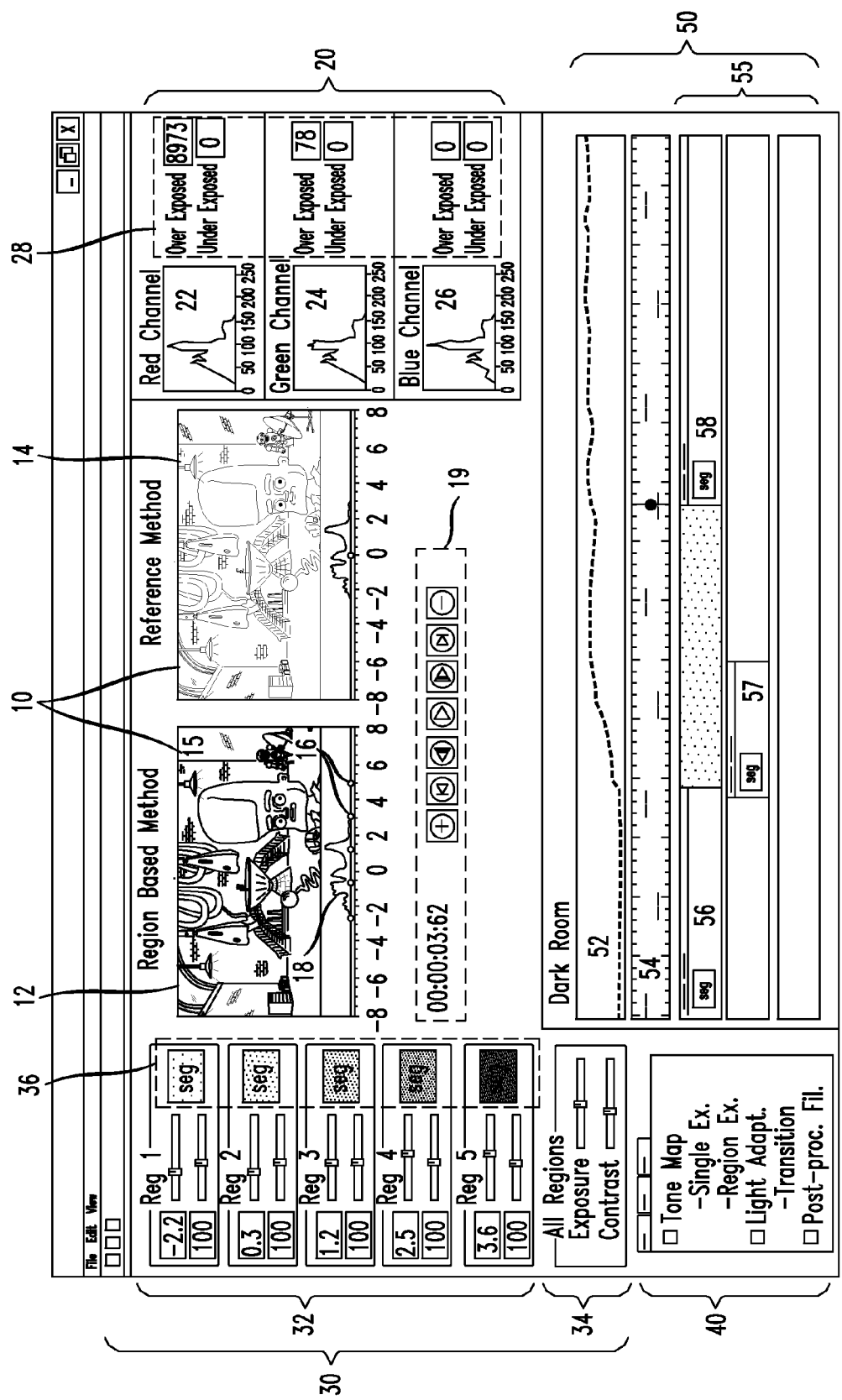
FIG. 3 shows a third view of the user interface at the second point in time which highlights the ability to shift operators and/or filters.

FIG. 3 shows the result of the user moving the operator 58 toward the left. Both the start time and the end time of the operator 58 have been moved to earlier times to the left on the time chart 54.

Figure 4:
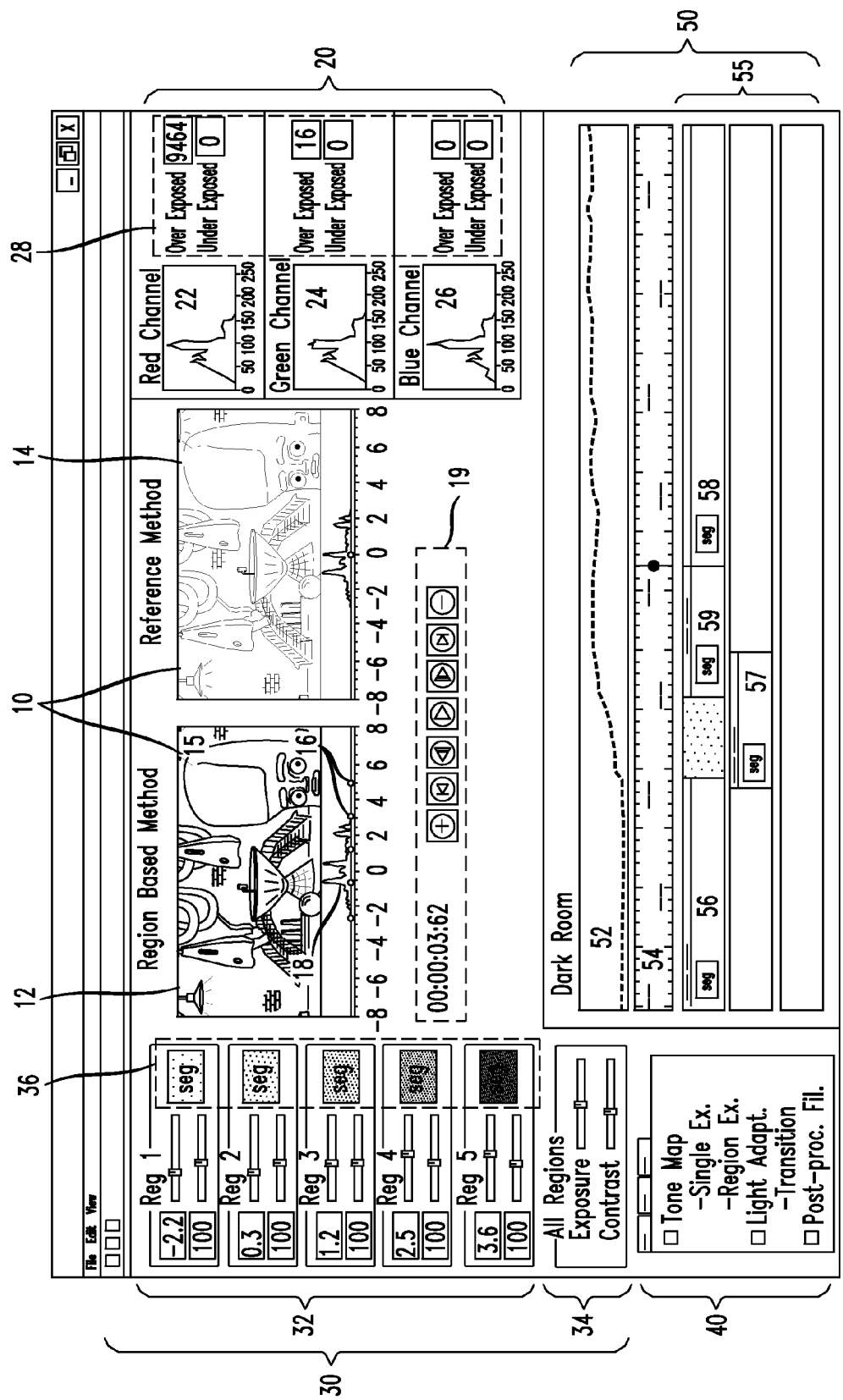
FIG. 4 shows a fourth view of the user interface at the third point in time which highlights the ability to add and show additional operators and/or filters.

FIG. 4 shows the result of the user adding new operators. Here, it is single exposure operator 59. For a typical HDR application, there may be a number of different tone mapping methods available. The user can choose different tone mapping methods for each scene. FIG. 4 shows the insertion of a single exposure operator from the workflow region 40 into the dark room 50.

Figure 5:
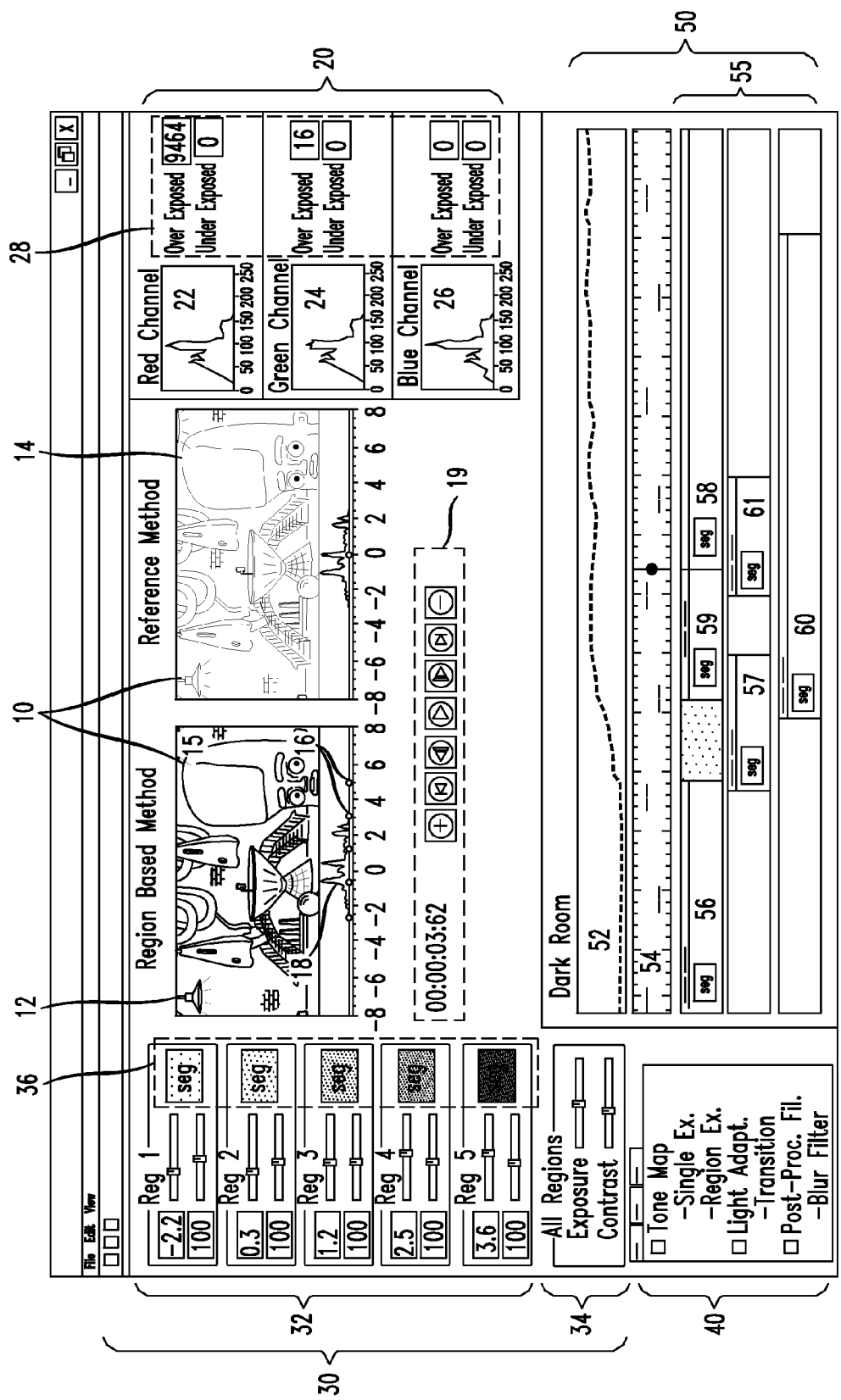
FIG. 5 shows a fifth view of the user interface at the third point in time which highlights the ability to add and show additional operators and/or filters in other operator bars.

FIG. 5 shows the result of the user adding yet more operators. A user can add these operators, for example, to achieve different functionality. For instance, the transition processors will, in this implementation, interpolate tone mapping parameters between the operators on either end of the transition processor. Additionally, a blur filter 60 has been dragged from the workflow region 40 into the dark room 50, and is shown inserted below the transition operators. The blurring filter will apply a Gaussian blurring to tone mapped frames as a post-processing filter.

As can be seen, multiple operators can be applied to any given frame. FIG. 5 shows, for example, that at about a time of 3:30 on the time chart 54, a region-based operator 58, a transition processor 61, and a blur filter 60 are all active. Additionally, these three operators all have different time ranges of application. However, it should be noted that the exposure/contrast settings and the anchor points are determined, in this implementation, based on start and end times of the transition processor. The transition processor is applied to attempt to provide a smooth transition between the region-based operator and the preceding single-exposure operator. In this implementation, the transition processor interpolates between the settings of the preceding single-exposure operator and the succeeding region-based operator. The blur filter 60 is then applied to the tone-mapped output after the tone mapping is performed by the transition processor.

Figure 6:
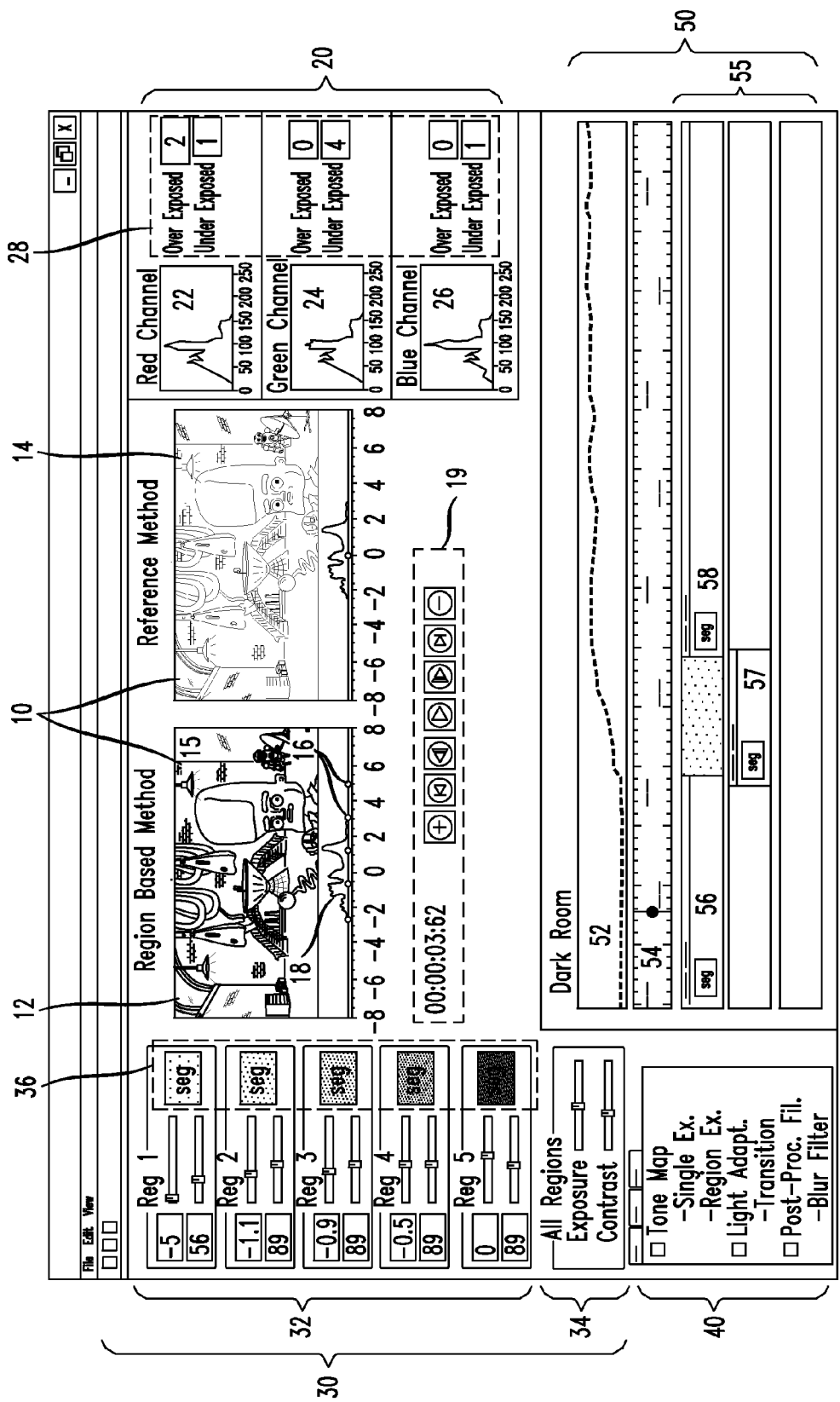
FIG. 6 shows a sixth view of the user interface at the first point in time which highlights the ability to change exposure and contrast levels.

FIG. 6 shows the result of the user changing the exposure and contrast levels. For each operator, the user can change the exposure and contrast for each region. Exposure is changed for a given region by moving the top slider of the given region. Contrast is changed for a given region by moving the bottom slider of the given region in the all-regions control section 34. Comparing to FIG. 1, only the exposure and contrast for region 10 are changed. Note that the exposure and contrast levels are set for each operator separately in this implementation. This means that the exposure and contrast levels will remain the same for the entire set of frames that is operated on by an operator. Of course, the regions are expected to change from frame to frame, depending on the pixel intensity values, but the exposure and contrast settings remain the same.

Figure 7:
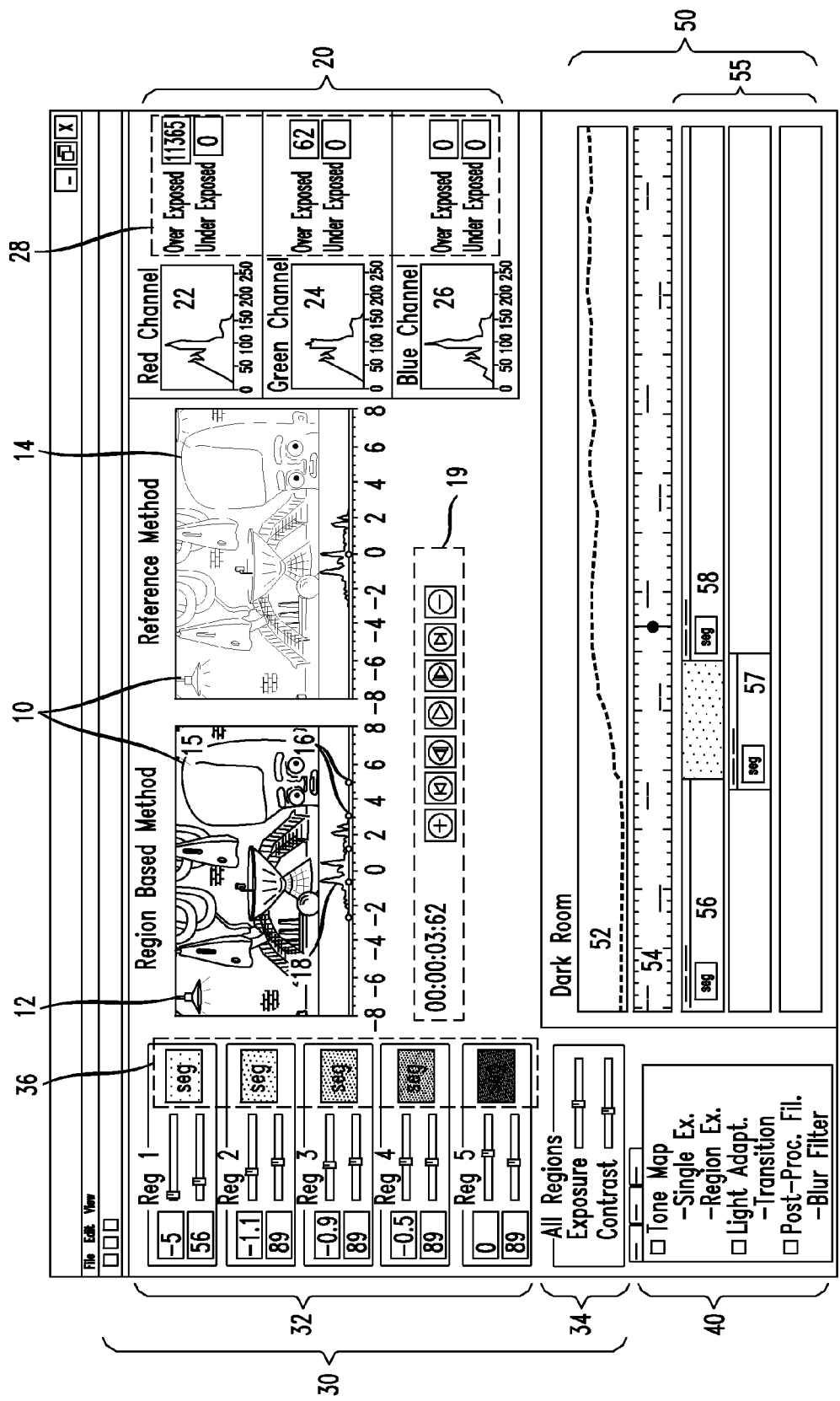
FIG. 7 shows a seventh view of the user interface at the fourth point in time which highlights the ability to shift anchor points.

FIG. 7 shows the result of the anchor points 16 on the HDR histogram being moved, as compared to FIG. 1. For different operators, the anchor points can be different. FIG. 7 shows a frame in the third scene. In comparison, FIG. 1 shows a frame in the first scene. As such, the algorithm is adapted such that the anchor points in different scenes can be different.

Figure 8:
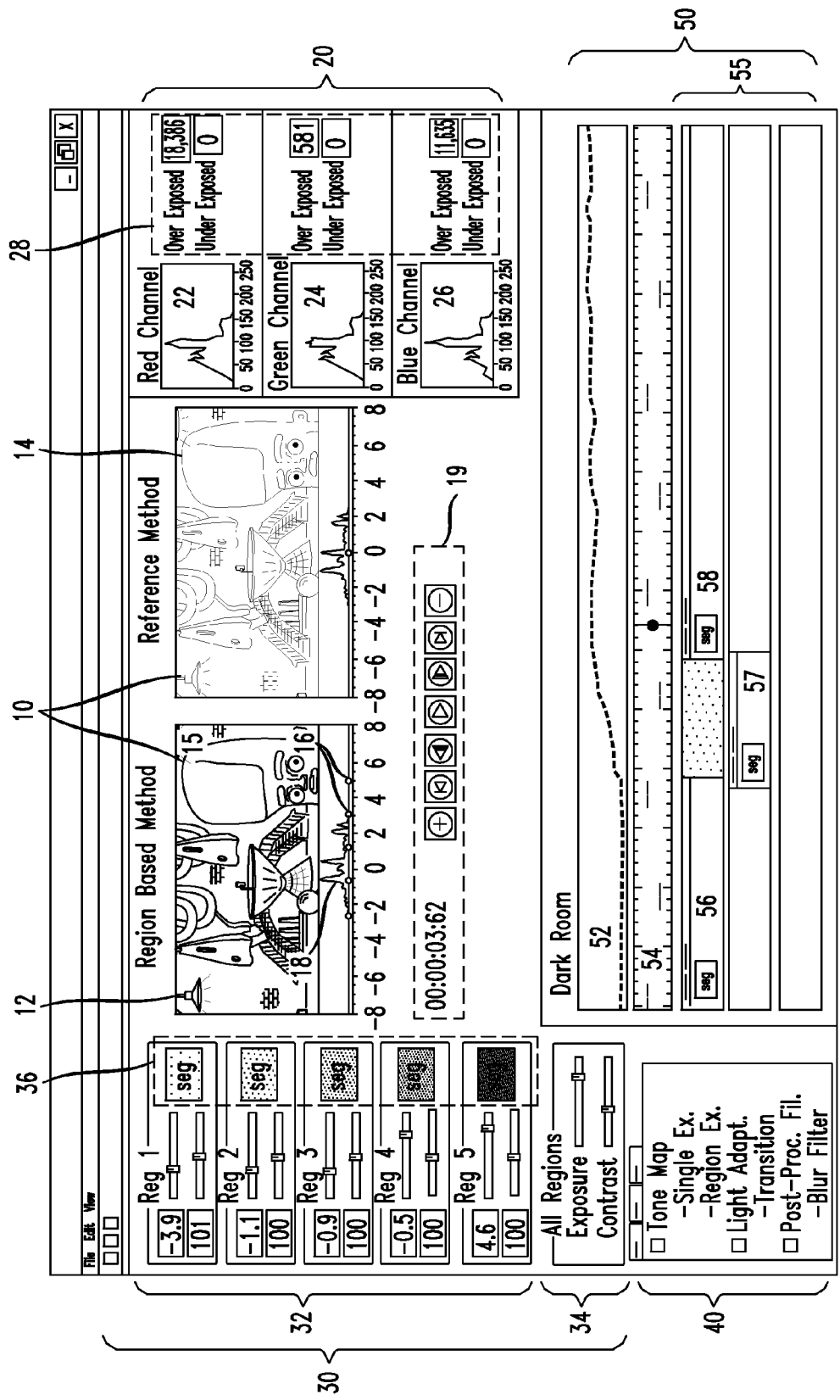
FIG. 8 shows an eight view of the user interface at the fourth point in time which highlights the ability to the number underexposed pixels and overexposed pixels simultaneous for individual colors.

FIG. 8 shows how the output displayed on the screen can guide the user in processing the video segment. For example, the color histograms 22, 24, 26 for the tone mapped image can guide the user to change parameters. In FIG. 8, the color histograms for the tone mapped image indicate a large number of saturated pixels in both the red and the blue channels. In particular, the readouts 28 for the red and blue channels indicate 18,386 overexposed pixels in the red channel, and 11,635 overexposed pixels in the blue channel. This information may guide the user to reduce exposures.

The algorithm is adapted to provide information in the screen that can guide the user in processing the video segment. For example, the luminance curve 52 shows the average luminance for each frame, and provides useful clues about where the scene boundaries occur. This can guide a user in selecting boundaries for operators in the dark room 50.

It is also possible to interactively change the anchor points of key frames. Anchor points, which are illustrated as dots 16 in the HDR histogram region 18, will define the segmentation of an HDR image into regions. For instance in FIG. 1, five anchor points are defined and the corresponding segmented regions are shown as five grey-scale images or weight images 36. In these grey-scale images 36, as has been explained above, bright points mean that the pixel belongs to current region with a high weight and vice versa. Once the user changes one anchor point, the segmentation of an HDR image will change, therefore the five grey-scale images 36 in FIG. 1 will be re-calculated and updated. At the same time, the tone mapped image 15 and its R,G,B color histograms 22, 24, 26 will also be updated. In such a case, the end user can thus have some control over the segmentation, and have some control over the output tone mapped image 15.

There are some clues on the screen to guide the user in modifying anchor points. The HDR histogram 18 is helpful for the user to determine where the best locations are to place anchor points. For instance, it is generally good to keep some distance between anchor points to cover the whole dynamic range. This is in contrast, for example, to putting the anchor points close together in the central part of the histogram. The "weight images" also provide intuitive clues to a user to change anchor points. The user may watch the weight image while changing anchor points to see whether the segmented regions are satisfied. That is, the user may watch to see if there are bright spots in each weight image, which would indicate that the region is being populated. If the region is being populated, then the user may leave the anchor points where they are. However, if the region is not being populated, then the user may decide, for example, to move the anchor points so that the unpopulated region is larger so that this region gets populated, and used. Alternatively, or in addition, the user can decide to delete an anchor point associated with that unpopulated region so that the region is enlarged and more likely to be populated and used.

The algorithm is adapted such that the number of anchor points is usually calculated automatically according to the dynamic range of the target HDR image/video. However, it is also possible to add or delete anchor points. The advantages will typically be similar to changing anchor points. For instance, sometimes a user can add more anchor points in order to have finer control over the tone mapped image.

In the implementation of FIG. 1, anchor points are usually fixed for scenes with static lighting. Therefore, changing the anchor points of a key frame will affect all frames in the same scene. For scenes with dynamic lighting such as an instance in which an opaque window gradually opens and lets sunlight into a room, the anchor points are interpolated automatically according to the anchor points in both the previous scene and the succeeding scene. In this case, the anchor points change for every frame in the dynamic lighting scene. Usually, it is not necessary for the user to change the anchor points in such a situation.

In the parameter setting window 30, the upper bars and lower bars will change the exposure and contrast parameter for each region, defined by the weight images. From the end user's viewpoint, upper bars change brightness and lower bars change contrast. At the bottom of the window, two extra global parameters (i.e. all-regions control section 34) are provided to simplify operations in some cases. Moving the global exposure bar will change the exposure parameters for all regions and moving the global contrast bar will change the contrast parameters for all regions. These two global bars can be used in situations, for example, in which the end user would like to change the global brightness or contrast. For instance, if the user finds out that the tone mapped picture is too bright, the user does not need to decrease the exposure parameter for each region separately. Instead, the user can move the global exposure bar to the left, which will result in moving of all upper (exposure) bars to the left for each region simultaneously.

Many features may be modified from the format shown in FIG. 1. For example, histograms may relate to multiple frames rather than just a single frame. Additionally, exposure and contrast parameters need not be set the same for all frames to which an operator is applied, but may be set, for example, for individual frames or smaller groups of frames. Further, anchor points need not be set the same for all frames to which an operator is applied, but may be set, for example, for individual frames or smaller groups of frames.

In sum, several implementations are provided relating to displaying information on a video segment, and displaying functions (for example, operators) for processing the video segment. The functions allow a user to process a video segment and, in particular, to perform tone mapping of HDR images. The displayed results and information, which can be histograms and/or average luminance, also guide the user in deciding what functions to apply or how to configure the parameters, which can be start time, end time, exposure, and/or contrast, for those functions. Variations of these implementations and additional applications are contemplated and within the disclosure, and features and aspects of described implementations may be adapted for other implementations.

Several of the implementations and features described in this application can be used in the context of the H.264/MPEG-4 AVC (AVC) Standard, and/or AVC with the MVC extension, and/or AVC with the SVC extension. Additionally, these implementations and features may be used in the context of another standard, or in a context that does not involve a standard.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way or ways, to achieve at least substantially the same result or results as the implementations disclosed. Accordingly, these and other implementations are contemplated by this application.

The following list summarizes a number of various implementations. The list is not intended to be exhaustive but merely to illustrate some of the many possible implementations.

1. Displaying information for performing tone mapping on video.

2. Implementation 1, including accepting user input to control the tone mapping.
3. Implementations 1-2, in which the user input results in a change to the displayed information.
4. Implementations 1-3, in which the displayed information includes one or more of video before tone mapping, video after tone mapping, video after tone mapping using a reference model, and parameters used to process the video.
5. Implementation 4, in which the parameters include one or more of average luminance for a frame or frames (e.g. a sequence), color histograms of a frame or frames, locations of anchor points for segmenting one or more frames into regions, exposure or contrast controls for one or more regions, and a time chart showing positioning of operators.
6. Implementations 1-5, in which the display shows the user frame based data (e.g. average luminance), the user inputs start and/or end times for operators, and the display then shows new tone mapped output based on the new times input by the user.
7. Implementations 1-5, in which the display shows the user anchor points for segmenting one or more images, the user moves the anchor points which results in a new segmentation, and the display then shows information indicating the new segmentation (e.g. masks) as well as new tone mapped output based on the new segmentation.
8. A processing device, in, for example, a pre-processor, an encoder, a transmitter, a receiver, a decoder, or a post-processor that performs one or more of the above Implementations.
9. A device, such as for example, a pre-processor, an encoder, a transmitter, a receiver, a decoder, a post-processor, a set-top box, a cell-phone, a laptop or other personal computer, a PDA, or other consumer communications equipment, containing a processing device of Implementation 8.
10. A signal containing data or descriptive information generated from one or more of the above Implementations, or that is provided by a device of one or more of the above Implementations.

The invention claimed is:
1. A system for processing video data, comprising:
a hardware processor; and
a display screen configured to:
render a graphical user interface containing a video player region providing a regional current video output section and a global current video output section on the display, wherein the regional current video output section in the video player region presents a region-based tone mapping and the global current video output section in the video player region presenting a global-based tone mapping, wherein the regional current video output section is always displayed when the global current video output is displayed;
render a regional video section and a regional histogram region in the provided regional current video output section of the rendered graphical user interface;
render a plurality of histogram intensity values in the regional histogram region for a current video frame being processed in the regional video section and a plurality of anchor points within the regional histogram region to demonstrate a division of the regional histogram region into a plurality of exposure regions, wherein the displayed plurality of anchor points within the regional histogram region are operated by the regional histogram region;
render a regional control section comprising of a regional changeable exposure control and a regional changeable contrast control;
render a global video section and a global histogram region in the provided global current video output section of the rendered graphical user interface;
render a plurality of histogram intensity values in the global histogram region for the current video frame being processed in the global video section and a plurality of anchor points within the global histogram region to demonstrate a division of the global histogram region into a plurality of exposure regions, wherein the displayed plurality of anchor points within the global histogram region are operated by the global histogram region;
render a global control section comprising of a global changeable exposure control and a global changeable contrast control;
render an operator section and a time line that are adjacent to one another and below of the video player region provided in the rendered graphical user interface, wherein the time line shows the time of the current frame of video being processed;
render a color histogram region that simultaneously demonstrates individual color histograms for the current frame of video being processed on the render graphical user interface;
render a readout section within the rendered color histogram region that simultaneously demonstrates a measurement of a number of pixels that are overexposed or underexposed for each individual colors associated with the color histogram region; and
render the regional current video output section, the global current video output section, the regional video section, the global video section, the regional histogram region, the global histogram region, the regional control section, the global control section, the color histogram region and the readout section simultaneously within the rendered graphical user interface.
2. The system of claim 1, wherein the plurality of anchor points within the regional histogram region and the global histogram region are changeable through the rendered graphical user interface.
3. The system of claim 1, wherein the time line and the operator section are displayed simultaneously.
4. The system of claim 3, further comprising render a color histogram region that simultaneously shows individual color histograms for the current frame of video being processed on the rendered graphical user interface.
5. The system of claim 4, further comprising render a readout section in the color histogram region that simultaneously shows a measure of a number of pixels for each color that are overexposed or underexposed for individual colors associated with the color histograms.
6. The system of claim 3, wherein the rendered operator section comprises of multiple operator bars that extend along with the time line and the operator bars are adapted to hold and display one or more operators.
7. The system of claim 6, wherein the operators comprise a blur filter, a transition processor, a region-based operator, or a global-based operator.
8. The system of claim 1, wherein the rendered graphical user interface is configured to convert higher dynamic range video data to lower dynamic range video data.

9. A method for processing video data, comprising:
displaying a frame of the video data in a video player region of a graphical user interface, wherein the frame of the video data is displayed simultaneously in a regional current video output section for a region-based tone mapping and in a global current video output section for a global-based tone mapping in which the regional current video output section and the global current video output section are arranged side by side, wherein the regional current video output section is always displayed simultaneously when the global current video output is displayed;
displaying a regional video section and a regional histogram region in the regional current video output section, wherein the displayed regional histogram region provides a plurality of anchor points to show a division of the regional histogram region into a plurality of exposure regions;
displaying a global video section and a global histogram region in the global current video output section, wherein the displayed global histogram region provides a plurality of anchor points to show a division of the global histogram region into a plurality of exposure regions;
displaying a regional control section adjacent to the video player region, wherein the regional control section comprises of a regional changeable exposure control means and a regional changeable contrast control means for multiple regions of the frame of the video data being processed;
displaying a global control section adjacent to the regional control section and the video player region, wherein the global control section comprises of a global changeable exposure control means and a global changeable contrast control means;
changing exposure and contrast for a region of the frame of the video data of the regional current video output section by using the regional control section;
changing exposure and contrast for the entire frame of the video data by using the global control section;
displaying an operator section and a time line that are adjacent to one another and below the video player region, wherein the time line shows the time of the frame of the video being processed; and
displaying a color histogram region that simultaneously shows individual color histograms for the frame of video being processed, wherein the color histogram region is displayed adjacent to the video player region; and
displaying a readout section within the color histogram region that simultaneously shows a measurement of a number of pixels that are overexposed or underexposed for each individual colors associated with the color histogram region.

10. The method of claim 9, wherein the time line and the operator section are displayed simultaneously.

11. The method of claim 9, further comprising: applying changes to the frame of the video data through the graphical user interface by adjusting at least the regional changeable exposure control means or the regional changeable contrast control means for multiple regions of the frame of the video data being processed, wherein a visual result of the changes to the frame of the video data are displayed in the video player region.

12. The method of claim 9, further comprising: applying changes to the frame of the video data through the graphical user interface by adding at least one operator to the operator section, wherein a visual result of the changes to the frame of the video data are displayed in the video player region.

* * * * *